US012764033B2

(12) United States Patent
Levy et al.

(10) Patent No.: US 12,764,033 B2
(45) Date of Patent: Oct. 13, 2026

(54) SYSTEMS AND METHODS OF FLOW SIZE CLASSIFICATION USING MACHINE LEARNING

(71) Applicant: MELLANOX TECHNOLOGIES, LTD., Yokneam (IL)

(72) Inventors: Gil Levy, Hod-Hasharon (IL); Ran Sandhaus, Tel Aviv-Jaffa (IL); Shie Mannor, Haifa (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 1043 days.

(21) Appl. No.: 17/961,298

(22) Filed: Oct. 6, 2022

(65) Prior Publication Data

US 2024/0121164 A1 Apr. 11, 2024

(51) Int. Cl.

| | |
|---|---|
| ***H04L 41/16*** | (2022.01) |
| ***G06N 5/022*** | (2023.01) |
| ***H04L 47/2441*** | (2022.01) |

(52) U.S. Cl.

CPC ............. *H04L 41/16* (2013.01); *G06N 5/022* (2013.01); *H04L 47/2441* (2013.01)

(58) Field of Classification Search

CPC ... H04L 41/16; H04L 47/2441; H04L 43/026; G06N 5/022; G06N 5/01; G06N 20/00

See application file for complete search history.

(56) References Cited

U.S. PATENT DOCUMENTS

| | | | | |
|---|---|---|---|---|
| 7,139,872 | B1 * | 11/2006 | Bachmat | G06F 11/3447 711/E12.019 |
| 7,724,760 | B2 * | 5/2010 | Balakrishnan | H04L 47/50 370/230.1 |
| 9,886,301 | B2 | 2/2018 | Hudzia et al. | |
| 10,218,629 | B1 * | 2/2019 | An | H04L 45/243 |
| 10,764,189 | B1 * | 9/2020 | Rivaud | H04L 45/70 |
| 10,924,418 | B1 * | 2/2021 | Gudibanda | H04L 43/024 |
| 11,909,656 | B1 * | 2/2024 | Chang | H04L 47/11 |
| 2008/0084898 | A1 * | 4/2008 | Miyaho | H04L 47/10 370/498 |
| 2010/0020689 | A1 * | 1/2010 | Tang | H04L 47/12 370/235 |

(Continued)

FOREIGN PATENT DOCUMENTS

| | | | | |
|---|---|---|---|---|
| CN | 109639624 A | * | 4/2019 | H04L 43/18 |
| CN | 111131335 A | * | 5/2020 | G06N 3/047 |

(Continued)

OTHER PUBLICATIONS

Poupart et al. "Online Flow Size Prediction for Improved Network Routing," 2016 IEEE 24th International Conference on Network Protocols (ICNP), Singapore, 2016, pp. 1-6.

(Continued)

*Primary Examiner* — Michael A Keller

(74) *Attorney, Agent, or Firm* — Sheridan Ross P.C.

(57) ABSTRACT

A network device, system-on-a-chip, and method of performing packet handling are described. A packet is received, and data associated with the packet is processed, using a configurable artificial intelligence engine, to generate a size classification for a flow associated with the packet. An action is performed based, at least in part, on the size classification for the flow associated with the packet.

20 Claims, 7 Drawing Sheets

(56) References Cited

U.S. PATENT DOCUMENTS

| | | | | |
|---|---|---|---|---|
| 2010/0195538 | A1* | 8/2010 | Merkey | H04L 43/02 370/255 |
| 2015/0271081 | A1* | 9/2015 | Arumilli | H04L 47/32 370/235 |
| 2015/0281102 | A1* | 10/2015 | Lee | H04L 47/621 370/236 |
| 2015/0281106 | A1* | 10/2015 | Lee | H04L 45/38 370/236 |
| 2015/0381459 | A1* | 12/2015 | Xiao | H04L 43/12 370/253 |
| 2016/0105364 | A1* | 4/2016 | Kanonakis | H04L 47/2441 370/235 |
| 2017/0099532 | A1* | 4/2017 | Kakande | H04Q 11/0066 |
| 2017/0359244 | A1* | 12/2017 | Gusat | H04L 43/022 |
| 2018/0241677 | A1* | 8/2018 | Srebro | H04L 47/2441 |
| 2019/0200105 | A1* | 6/2019 | Cheng | H04L 47/2441 |
| 2019/0312815 | A1* | 10/2019 | Altman | H04W 28/0236 |
| 2020/0145340 | A1* | 5/2020 | Mula | H04L 49/3018 |
| 2020/0259680 | A1* | 8/2020 | Thubert | H04L 45/16 |
| 2020/0412659 | A1* | 12/2020 | Arditti Ilitzky | H04L 43/087 |
| 2021/0111992 | A1* | 4/2021 | Nainar | H04L 45/24 |
| 2021/0281524 | A1* | 9/2021 | Zhang | H04L 47/762 |
| 2021/0385169 | A1 | 12/2021 | Urman et al. | |
| 2022/0006748 | A1* | 1/2022 | Pallagatti Kotrabasappa | H04L 47/803 |
| 2022/0012590 | A1* | 1/2022 | Shen | G06N 3/09 |
| 2022/0058468 | A1* | 2/2022 | Gadfort | G06F 15/7867 |
| 2022/0070720 | A1* | 3/2022 | Natarajan | H04W 28/0215 |
| 2022/0131835 | A1* | 4/2022 | Fenton | H04L 63/1458 |
| 2023/0269148 | A1* | 8/2023 | Foo | G06F 16/2255 709/224 |
| 2023/0388852 | A1* | 11/2023 | Sharma | H04W 28/065 |

FOREIGN PATENT DOCUMENTS

| | | | | | |
|---|---|---|---|---|---|
| CN | 116668085 | A | * | 8/2023 | G06N 20/00 |
| EP | 3484122 | A1 | * | 5/2019 | H04L 63/1425 |
| KR | 20220030661 | A | * | 3/2022 | H04L 1/242 |
| WO | WO-2006071560 | A2 | * | 7/2006 | H04L 43/02 |

OTHER PUBLICATIONS

U.S. Appl. No. 17/746,460, filed May 17, 2022, Sandhaus et al.

* cited by examiner

SYSTEMS AND METHODS OF FLOW SIZE CLASSIFICATION USING MACHINE LEARNING

FIELD OF THE DISCLOSURE

The present disclosure is generally directed to an end-to-end data-driven approach for flow size classification.

BACKGROUND

In networking, a flow is a sequence of packets that can be defined by a 5-tuple comprised of the following: Source IP, Source Port, Destination IP, Destination Port, Protocol number (Transmission control protocol (TCP), user datagram protocol (UDP), etc.). Currently, flows are classified as mice flows (i.e., small volume, short-lived flows) and elephant flows (i.e., large volume, long-lived flows).

SUMMARY

The present disclosure is generally directed to an end-to-end data-driven approach for flow size classification. More specifically, data associated with a packet is processed by a configurable artificial intelligence engine, to generate a size classification indication for a flow associated with the packet; and an action may be performed, based at least in part on the size classification indication for the flow associated with the packet.

Some research suggests that mice flows comprise more than 90% of all flows in a data center network, but carry less than 10% of the total number of bytes transmitted on the network. Elephant flows are just the opposite, constituting only 10% of the flows, but carrying 90% of the transmitted bytes. The mice/elephant binary size classification is insufficient in a number of ways. One issue is that small elephant flows will be handled the same as large elephant flows. For example, if the cutoff for mice flows is <10 KB, then an 11 KB flow will be treated the same as a much larger flow. Conventional systems and methods may incur excessive costs in latency, bandwidth, table area, etc.

In an embodiment disclosed herein, a device, such as a switch, a network interface controller (NIC), or other computer system capable of receiving and transmitting data, is enabled to receive a packet, process information from the packet using an artificial intelligence (AI) and/or machine learning (ML) engine, determine a size classification, and perform an action based, at least in part, on the determined size classification. In other words, the system, device, and method described herein determine/detect multiple meaningful flow size classes (e.g., based on bandwidth), and quickly estimate which class a given flow belongs to. The system, device, and method may also generate an indicator, include the indicator in the metadata of the packet, and transmit the packet based, at least in part, on the indicator. A device, as described herein, may be enabled to forward a received packet to a proper destination.

Systems and methods as described herein offer a number of advantages over conventional approaches. For example, disclosed systems and methods offer size classification using ML and multiple (e.g., more than two) size classifications, which provides more meaningful size classifications as compared to conventional systems. Disclosed systems and methods can be used for a variety of problems as described herein. Disclosed systems and methods offer a more robust and secure networking scheme as compared to conventional systems; disclosed systems and methods offer enhanced network traffic telemetry as compared to conventional systems; and disclosed systems and methods offer an efficient abstraction layer combined with a classical forwarding control pipeline as compared to conventional systems.

Additional features and advantages are described herein and will be apparent from the following description and the figures.

BRIEF DESCRIPTION OF THE DRAWINGS

The present disclosure is described in conjunction with the appended figures, which are not necessarily drawn to scale.

DETAILED DESCRIPTION

Figure 1:
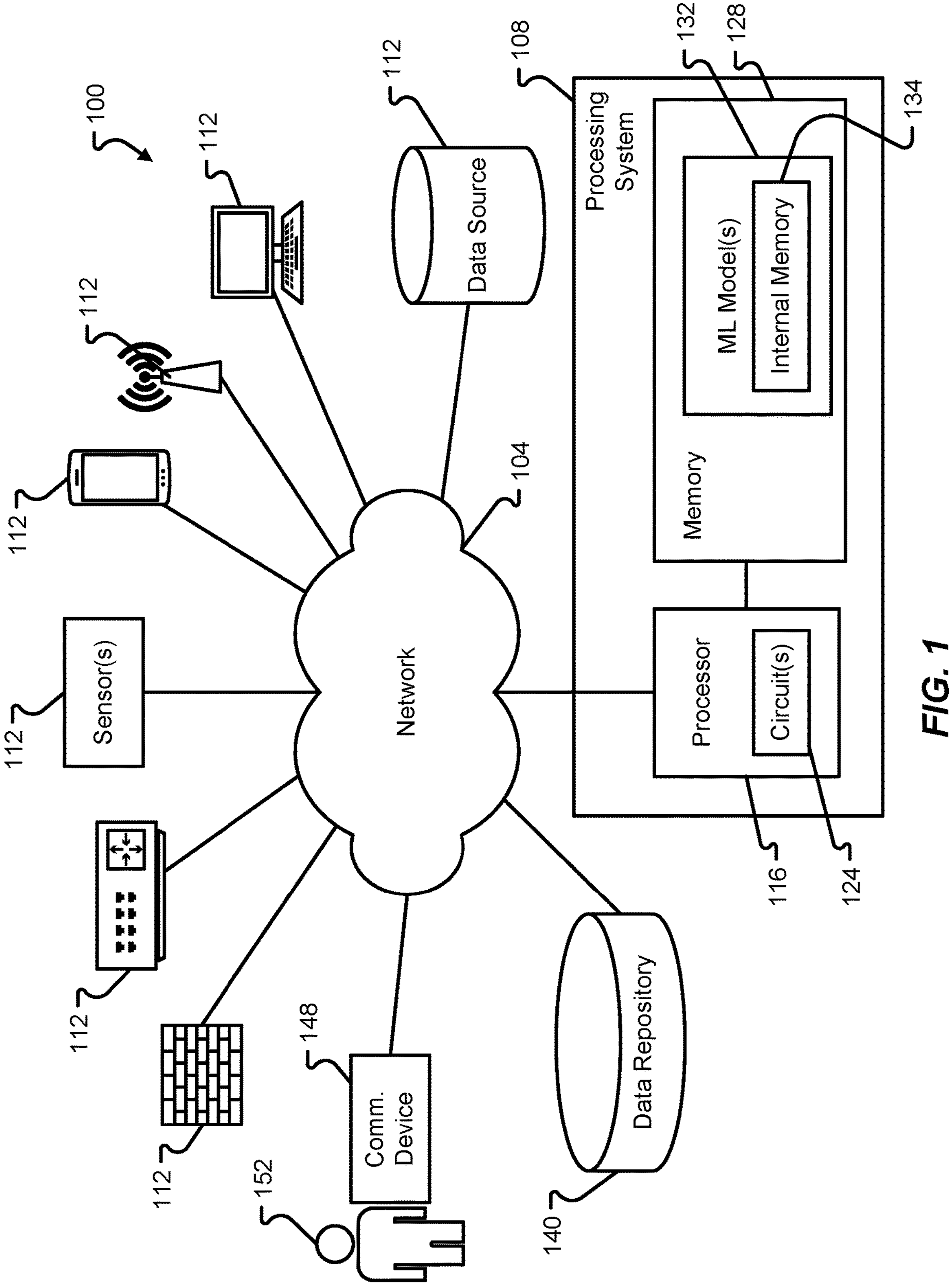
FIG. 1 is an illustration of a computing environment in accordance with one or more embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably, and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The present disclosure performs size classification with machine learning (ML) techniques, the ML model is trained based on recorded flow data (e.g., .pcap files). In embodiments, the ML model may be trained using unsupervised learning. For example, using unsupervised learning the training data is clustered to determine meaningful size classes. In embodiments, once the ML model is trained, the ML model is tested using supervised learning (e.g., neural network/decision tree/etc.) to classify flows to their corresponding size class based on limited data to determine when the ML model is ready for deployment.

Additionally, the present disclosure performs size classification using multi-class classification, with more meaningful size classifications beyond mice/elephant. In embodiments, the size classifications are determined by clustering data and making the size definitions based on how the data is clustered. Using this method, the size classification may have different ranges (e.g., 1 KB-10 KB, 11 KB-50 KB, 51 KB-500 KB, etc.). Additionally, or alternatively, the clusters may vary in size (e.g., first cluster includes ten flows, second cluster encompasses fifteen flows, etc.). The combination of the size class estimation and the multi-class supervised classification results in a full end-to-end algorithmic pipeline for classification over auto-detected classes.

The present disclosure relates to a method, device, and system for automatically determining correct flow size class division. In embodiments, the flow size classes may be defined according to various network parameters (e.g., packet size, bandwidth, total length, etc.). The flow size class division described herein is more useful than simple elephant/mice classifications, that is to say, there may be more than two size classes. Additionally, the range of each size class may be different. The current disclosure also relates to creating and training a ML based model for classification of unseen flows into size classes. Advantageously, the ML model uses initial and/or partial information of the flow (e.g., metadata extracted from N first packets) to determine a size classification for the flow associated with the packet. This algorithmic framework can be extended to other target functions (e.g., instead of bandwidth class, the same process can be used for bandwidth standard deviation).

Figure 5:
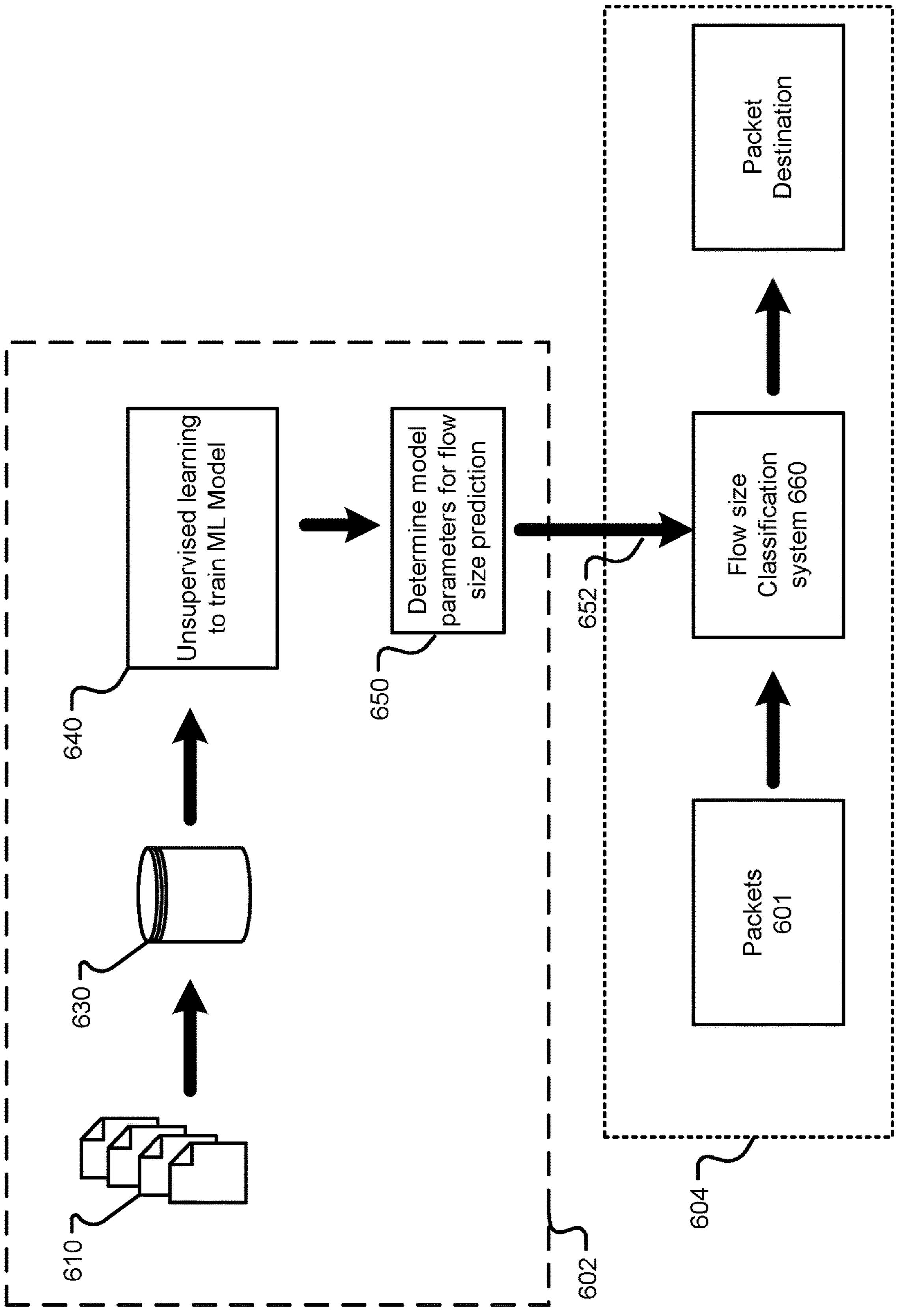
FIGS. 5-6 are block diagrams illustrating a framework in accordance with one or more embodiments of the present disclosure.
Figure 6:
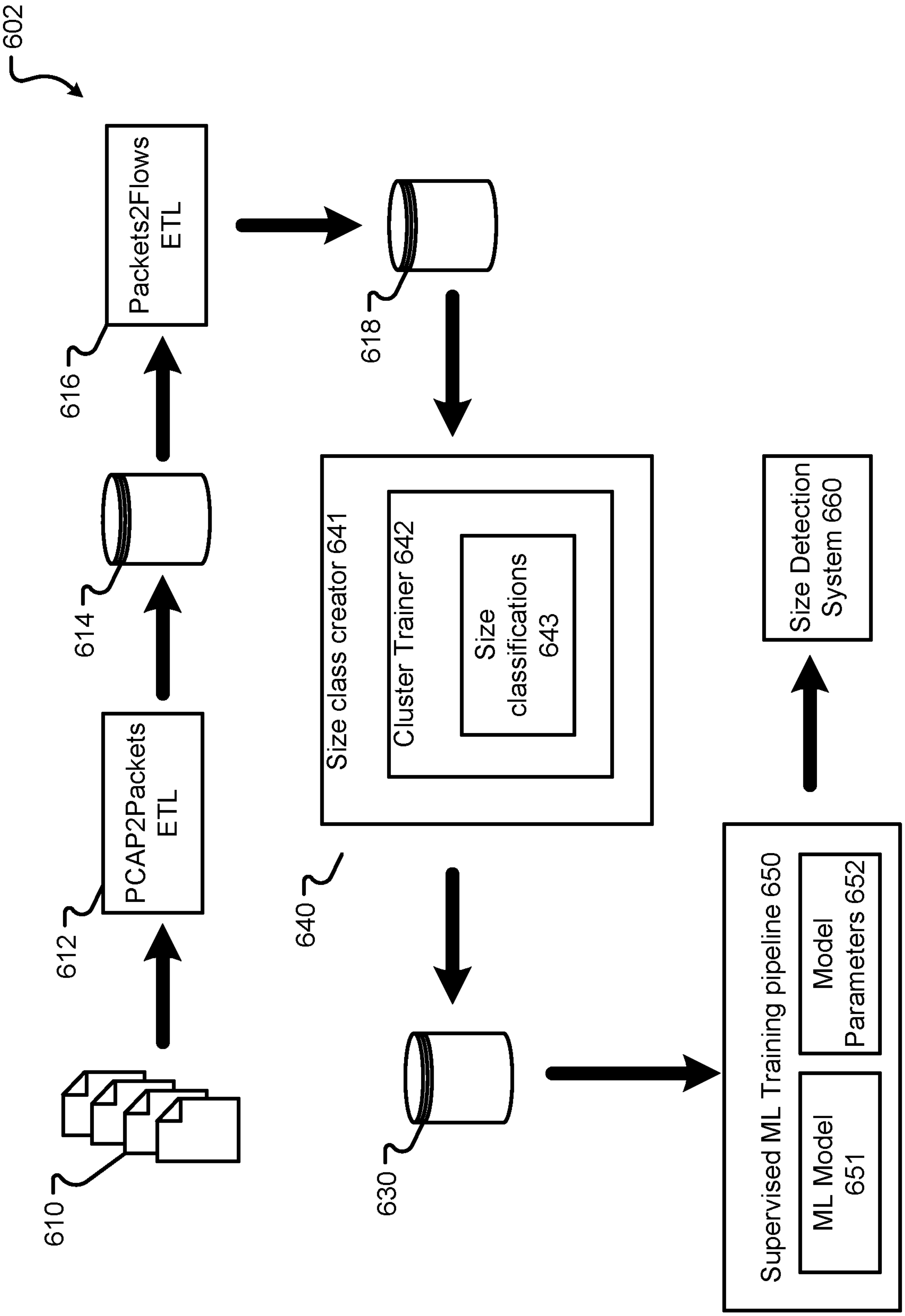

The present disclosure is composed of a training framework 602 and an inference framework 604 as illustrated in FIGS. 5-6.

Packet Capture (PCAP) is an application programming interface (API) that captures live network packet data. In embodiments, .pcap files 610 collect and record packet data from a network.

Referring now to FIG. 5, the training framework 602 includes a classified flows database 630 (e.g., the database 630 stores .pcap files 610), unsupervised learning (640) to train a ML model, and determining model parameters 652 for flow size classification system 660. The inference framework 604 receives model parameters 652 into the flow size classification system 660 (e.g., configurable artificial intelligence engine). Packets 601 are also received into the flow size classification system 660, which determines flow size classification for each flow associated with the packets 601. After the packets 601 have been classified, the packets 601 are forwarded to their destination. A more detailed training framework 602 and inference framework 604 is illustrated in FIG. 6.

Referring now to FIG. 6, the training framework 602 starts with the flow creation database stage, which creates a raw flows database 618. In embodiments, .pcap files 610 collect and record packet data from a network. The flow creation database stage is further composed of two extract/transform/load (ETL) processes 612/616. First, in the PCAP2Packets ETL 612, one or more .pcap files 610 are read to determine a timeline the packets were received in some network interface. For example, from each packet, some metadata is extracted (e.g., 5-tuple, size, time, etc.). The packets are represented into a packets database 614. A second Packets2Flow ETL process 616 may read the metadata for each packet, and group packets from the same flow (e.g., the flow may be identified using the 5-tuple). Flows with less than N adjacent data packets may be filtered. Eventually a raw flows database 618 is created. In embodiments, each entry may comprise a flow 5-tuple, N first recorded adjacent packets sizes, time deltas between these packets, and bandwidth or total length in bytes. The bandwidth is calculated based on an average bandwidth per flow for the whole dataset (e.g., total bytes/total time).

In embodiments, the raw flows database 618 comprises a table that maps flows (i.e., 5-tuples+additional metadata– into the flow bandwidth/total length (bytes)). The metadata includes (at least) N adjacent packet sizes, and a time delta between each two packets in this N adjacent packets neighborhood. The raw flows database 618 is read by the size class creator 641. In embodiments, size class creation is performed using unsupervised learning 640, and more specifically, clustering via cluster trainer 642.

The cluster trainer 642 automatically divides the bandwidth space (previously calculated) into the meaningful classes (e.g., size classifications 643). In embodiments, the cluster trainer 642 may perform K-means clustering. The raw flows database 618 is read by the size class creator 641, which detects the most suitable division of the flows (e.g., training data set) into size classes and also the borders between these classes, in terms of size units (bandwidth/total length). From these borders the raw flows database 618 may be mapped into a classified flows database 630. In embodiments, a column may be added to each entry in the raw flows database 618, which includes the size class (e.g., size class indicator) each flow belongs to.

A supervised machine learning training pipeline 650 can be employed using the classified flows database 630. The classified flows database 630 is preprocessed to suit the flow data to a specific ML model (e.g., ML model 651) if needed (e.g., neural networks, decision trees, etc.). The supervised machine learning training pipeline 650 splits the classified flows database 630 into a training dataset and a testing dataset (not shown). The supervised machine learning training pipeline 650 trains the ML model 651 on the training set with some hyperparameters. Eventually a model parameters 652 file is created.

The inference framework 604 uses the same preprocessing done in the training pipeline 650 and uses a flow size classification system 660, initialized with the model parameters 652 obtained from the supervised machine learning training pipeline 650. The flow size classification system 660 applies the model parameters 652 to packets 601 (i.e., new unseen data (packets)) to determine a flow size for each flow associated with the packets 601.

Preprocessing may comprise modifying data to generate data capable of being used as an input to the AI engine (e.g., size class creator 641, supervised ML training pipeline 650, AI-Based Configurable Engine 412, size classification system 660, etc.). Preprocessing may comprise mapping data from a database to one or more specific types of groups or flows. Preprocessing may comprise filtering the data to prepare the data to be processed by the ML model. Preprocessing the data may comprise normalizing and/or scaling the data. For example, in the case of a neural network, the data may be normalized and/or scaled to a limited range to be processed by the neural network. Preprocessing the data may comprise performing feature selection of the 5-tuple.

Figure 7:
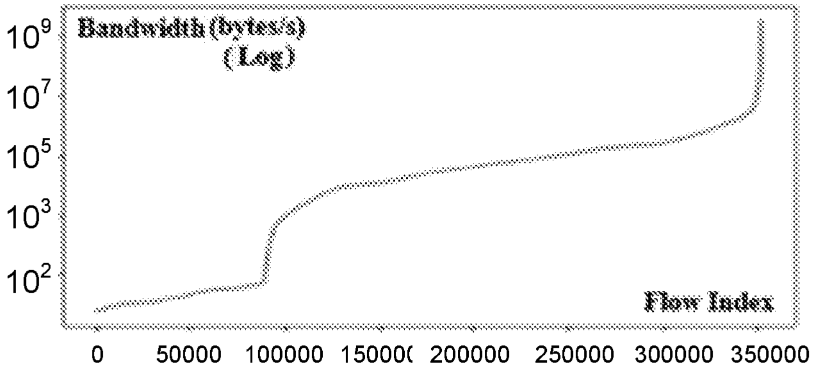
FIG. 7 illustrates graphs depicting bandwidth in reference to flow index for a dataset in accordance with one or more embodiments of the present disclosure.
Figure 7:
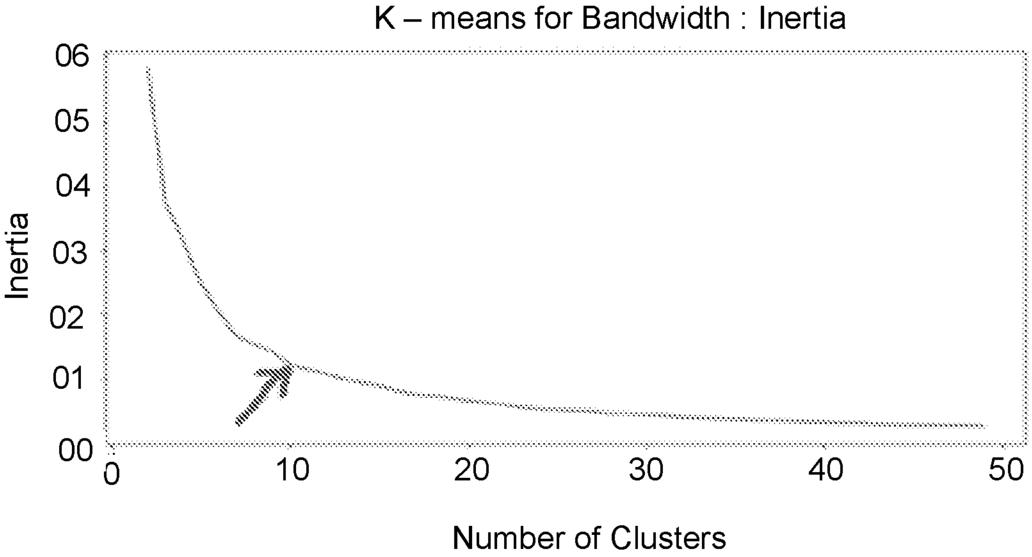

Referring now to FIG. 7, which illustrates bandwidth in reference to flow index for a dataset sorted monotonically rising by bandwidth. The bandwidth is presented in a log scale and we can see that bandwidth distance between flows rises exponentially for larger flows (even in some cases hyper-exponentially). For example, if a distance-based clustering, such as k-means clustering, is applied, a simple Euclidean distance of the bandwidth should not be used, but instead this distance over the logarithm applied on bandwidth since log-scaling will make the dataset behave more linearly—in other words the log of the bandwidth can be modeled as points in a geometric space, and hence we can use the Euclidean distance over it. In embodiments, the present disclosure uses k-means clustering over the log of the bandwidth with Euclidean distance.

Continuing, a cluster trainer 642 is used in order to create a mapping between number of clusters (noc) to a measure called inertia. A common practice to obtain best number of clusters and division to cluster is to take the amount that is the elbow of the inertia plot against number of clusters. The cluster trainer 642 loops over a range of cluster amount (e.g., from 2 to 50), clusters using the clustering algorithm (e.g., k-means clustering), calculates (inertia, metadata) per noc option and records that into a noc2i key-value store. Then, an Elbow Analysis is done over this noc2i key-value store in order to get the best number of clusters including relevant metadata.

The metadata includes the center of each cluster. These centers can be used to derive class borders (not shown). In embodiments, the point in the exact middle between each two adjacent clusters' centers can be taken as a border, which is transformed into a linear scale (e.g., using an exponential operator). These borders are then used in order to map each flow in the raw flow database 618 into the correct class. This may be written in a new column per flow to generate the classified flows database 630.

Referring now to FIGS. 1-5, various systems and methods for flow size classification will be described. While various embodiments will be described in connection with utilizing AI and similar techniques, it should be appreciated that embodiments of the present disclosure are not limited to the use of AI or other artificial intelligence/machine learning techniques, which may or may not include the use of one or more neural networks. As used herein, AI may refer to any of artificial intelligence, machine learning, neural network, or a combination thereof. AI as described herein may be implemented in hardware or software. For example, AI may comprise one or more of central processing units (CPUs), graphics processing units (GPUs), data processing units (DPUs), field-programmable gate arrays (FPGAs), application-specific integrated circuits (ASICs), etc., which may perform the AI functions described herein. The methods and systems described or claimed herein can be performed with traditional executable instruction sets that are finite and operate on a fixed set of inputs to provide one or more defined outputs. Alternatively, or additionally, methods and systems described herein can be performed using AI, ML, neural networks, or the like. A system or components of a system as described herein are contemplated to include finite instruction sets and/or AI-based models/neural networks to perform some or all of the processes or steps described herein.

In some embodiments, AI is utilized to analyze data packets. The data packets may be received directly from an originating computer system that generated the data packet, from a storage area that is used to temporarily store data packets originating in one or more computer systems, or from other computer systems. In some embodiments, data packets may be received in real-time, as part of a data stream transmitted directly from a data source to a computing device executing the AI system. In some embodiments, data packets may be received at some point after they were generated by a computer system.

Referring to FIG. 1, an illustrative computing environment 100 will be described in accordance with at least some embodiments of the present disclosure. A computing environment 100 may include a communication network 104, which is configured to facilitate machine-to-machine communications. In some embodiments, the communication network 104 may enable communications between several types of computer systems, which may also be referred to herein as data sources 112. A user may operate a data source 112 and/or computing device 148. One or more of the data sources 112 may be provided as part of a common network infrastructure, meaning that the data sources 112 may be owned and/or operated by a common entity. In such a situation, the entity that owns and/or operates the network including the data sources 112 may be interested in obtaining data packets from the various data sources 112.

Non-limiting examples of data sources 112 may include communication endpoints (e.g., user devices, Personal Computers (PCs), computing devices, communication devices 148, Point of Service (PoS) devices, laptops, telephones, smartphones, tablets, wearables, etc.), network devices (e.g., routers, switches, servers, network access points, etc.), network border devices (e.g., firewalls, Session Border Controllers (SBCs), Network Address Translators (NATs), etc.), security devices (access control devices, card readers, biometric readers, locks, doors, etc.), sensors (e.g., proximity sensors, motion sensors, light sensors, noise sensors, biometric sensors, etc.), etc. A data source 112 may alternatively or additionally include a data storage area that is used to store data packets generated by various other machines connected to the communication network 104. The data storage area may correspond to a location or type of device that is used to temporarily store data packets until a processing system 108 is ready to retrieve and process the data packets.

In some embodiments, a processing system 108 is provided to receive data packets from data sources 112 and determine a size classification for a flow associated with each packet. The processing system 108 may be an example of the size classification system 660 illustrated in FIGS. 5-6. The processing system 108 may be executed on one or more servers that are also connected to the communication network 104. The processing system 108 may be configured to receive a packet; process, using the configurable artificial intelligence engine (e.g., AI-Based Configurable Engine 412, size classification system 660, etc.), data associated with packets (e.g., the packets 601) to generate a size classification for a flow associated with each packet; and perform an action, at least in part, on the size classification for the flow associated with a packet. In some embodiments, the processing system 108 may forward a packet based, at least in part, on the size classification for the flow associated with the packet. The processing system 108 may be a switch, a NIC, or other device operable to receive and transmit data packets.

The processing system 108 is depicted as a single component in the system 108 for ease of discussion and understanding. It should be appreciated that the processing system 108 and components thereof (e.g., processor 116, circuit(s) 124, and/or memory 128) may be deployed in any number of computing architectures. For instance, the processing system 108 may be deployed as a switch, a NIC, a server, a collection of servers, a collection of blades in a single server, on bare metal, on the same premises as the data sources 112, in a cloud architecture (enterprise cloud or public cloud), and/or via one or more virtual machines.

Non-limiting examples of a communication network 104 include an Internet Protocol (IP) network, an Ethernet network, an InfiniBand (IB) network, a FibreChannel network, the Internet, a cellular communication network, a wireless communication network, combinations thereof (e.g., Fibre Channel over Ethernet), variants thereof, and the like.

As mentioned above, the data sources 112 may be considered host devices, servers, network appliances, data storage devices, security devices, sensors, or combinations thereof. It should be appreciated that the data source(s) 112 may be assigned at least one network address and the format of the network address assigned thereto may depend upon the nature of the network 104.

The processing system 108 is shown to include a processor 116 and memory 128. While the processing system 108 is only shown to include one processor 116 and one memory 128, it should be appreciated that the processing system 108 may include one or many processing devices and/or one or many memory devices. The processor 116 may be configured to execute instructions stored in memory 128 which may involve utilizing one or more ML models 132 stored in memory 128. Memory 128 may also hold weights/parameters obtained from a training process carried before. These weights/parameters may be used to configure the model implementation (which may either be a hardware and/or software component). The ML models 132 may include internal memory resources 134 that will store the weights/parameters when the ML models 132 are running. In one example, the ML models 132 are software implemented, and on system start, read the weights/parameters from a main memory/disk (e.g., memory 128) into internal memory resources 134. In another example, the ML models 132 are hardware implemented, and on system start, read the weights/parameters from the main memory/disk (e.g., memory 128) into the hardware internal memory resources 134 that are dedicated for storing the weights/parameters.

In some embodiments, the size classification system 660 is one example of the ML models 132. In some embodiments, the size classification system 660 and/or the ML models 132 may be deployed as part of the switching hardware 228. As some non-limiting examples, the memory 128 may correspond to any appropriate type of memory device or collection of memory devices configured to store instructions. Non-limiting examples of suitable memory devices that may be used for memory 128 include Flash memory, Random Access Memory (RAM), Read Only Memory (ROM), variants thereof, combinations thereof, or the like. In some embodiments, the memory 128 and processor 116 may be integrated into a common device (e.g., a microprocessor may include integrated memory).

In some embodiments, the processing system 108 may have the processor 116 and memory 128 configured as a GPU. The processor 116 may include one or more circuits 124 that are configured to execute an AI system using, for example, one or more ML models 132 stored in memory 128. Alternatively, or additionally, the processor 116 and memory 128 may be configured as a CPU. A GPU configuration may enable parallel operations on multiple sets of data, which may facilitate the real-time processing of one or more data packets from one or more data sources 112. If configured as a GPU, the circuits 124 may be designed with thousands of processor cores running simultaneously, where each core is focused on making efficient calculations.

Whether configured as a GPU and/or CPU, the circuits 124 of the processor 116 may be configured to execute AI in a highly efficient manner, thereby enabling real-time processing of data packets received from various data sources 112. As data packets are processed by the processor 116 executing AI, outputs of the AI may be provided to a data repository 140.

The processing system 108 may also be configured to analyze the data packet(s) stored in the data repository 140 (e.g., after the data packets received directly from the data sources 112 have been processed by the AI).

As noted above, the data source(s) 112, data repository 140, and/or the processing system 108 may include storage devices and/or processing circuitry for conducting computing tasks, for example, tasks associated with controlling the flow of data internally and/or over the communication network 104. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally, or alternatively, the processing circuitry incorporated in a data source 112 and/or processing system 108 may comprise hardware, such as an application specific integrated circuit (ASIC). Other non-limiting examples of the processing circuitry include an Integrated Circuit (IC) chip, a Central Processing Unit (CPU), a Graphics Processing Unit (GPU), a microprocessor, a Field Programmable Gate Array (FPGA), a collection of logic gates or transistors, resistors, capacitors, inductors, diodes, or the like. Some or all of the processing circuitries may be provided on a Printed Circuit Board (PCB) or collection of PCBs. It should be appreciated that any appropriate type of electrical component or collection of electrical components may be suitable for inclusion in the processing circuitry.

In addition, although not explicitly shown, it should be appreciated that the data source(s) 112, data repository 140, and/or the processing system 108 may include one or more communication interfaces for facilitating wired and/or wireless communication between one another and other unillustrated elements of the environment 100.

A processing system 108 may operate as an Ethernet switch, an InfiniBand switch, or another type of networking device. A processing system 108 may comprise, as described in greater detail below, an enclosure with external pluggable modules and one or more internal printed circuit boards (PCBs).

Figure 2:
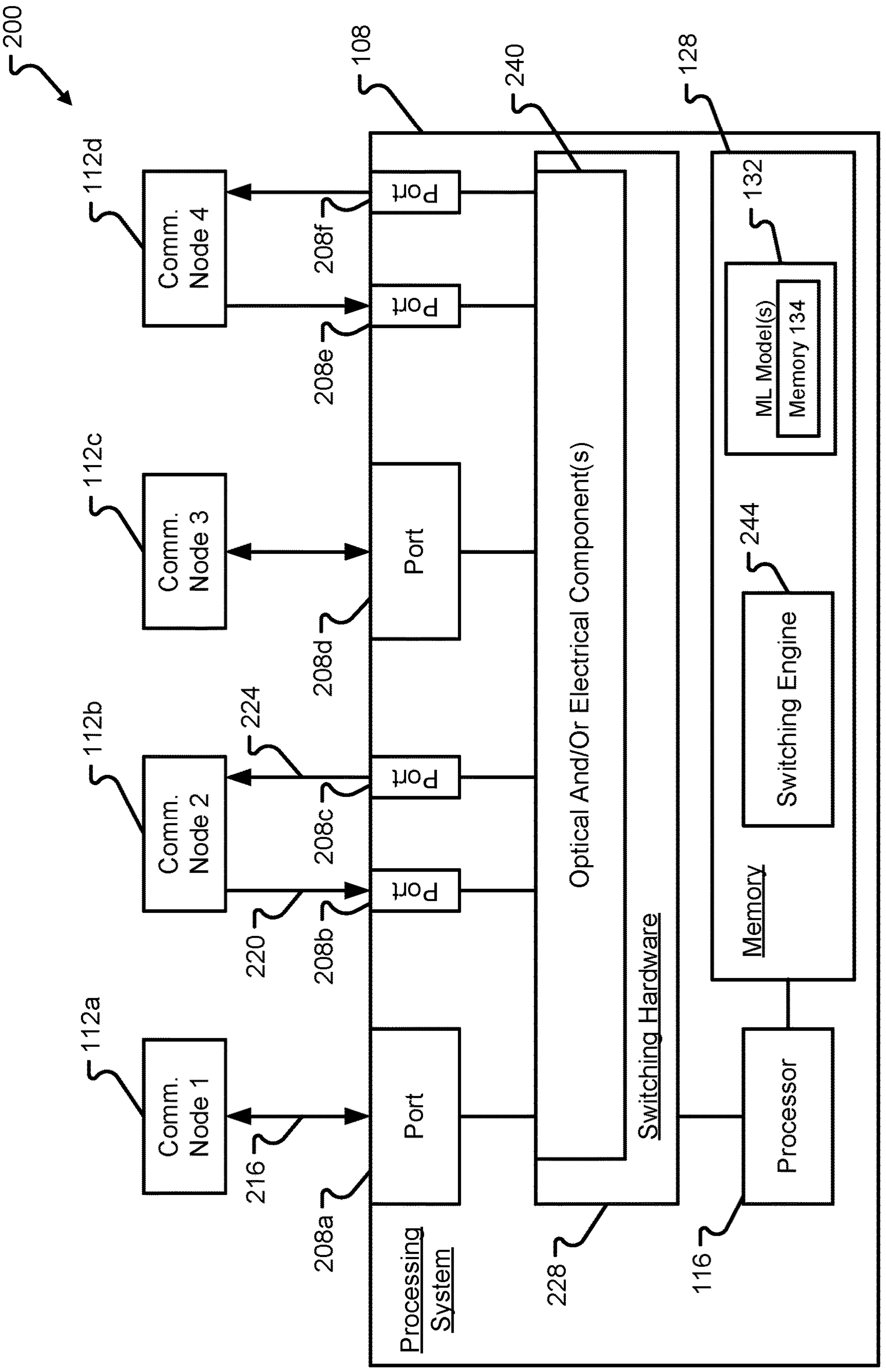
FIG. 2 is an illustration of a computing device in accordance with one or more embodiments of the present disclosure.

Referring initially to FIG. 2, a configuration of a communication system 200 will be described in accordance with at least some embodiments of the present disclosure. It should be appreciated that the components described with reference to FIG. 2 may or may not also be used in an environment 100 as shown in FIG. 1.

In the configuration of FIG. 2, a communication system 200 is shown to include a processing system 108, such as a switch, connecting one or more data sources 112 via a number of communication ports 208. The illustrated processing system 108 is shown to be connected with four data sources 112*a-d* via a plurality of communication ports 208. The illustration of four data sources 112*a-d* is for ease of discussion and should not be construed as limiting embodiments of the present disclosure.

Specifically, a processing system 108 may be configured to connect any suitable number of data sources 112 and the processing system 108 may include a number of ports 208 to facilitate such connections. Even more specifically, a processing system 108 may be configured to connect a greater or lesser number of data sources 112 than are shown in FIG. 2. Moreover, embodiments of the present disclosure contemplate that not all ports 208 of a processing system 108 need to be connected with a data source 112. For instance, one or more ports 208 of a processing system 108 may be left unconnected (e.g., open) and may not have any particular networking cable/bidirectional communication link 216 plugged into the port 208.

The data sources 112*a-d* may be the same type of devices or several types of devices. As a non-limiting example, some or all of the data sources 112*a-d* may correspond to a Top-of-Rack (TOR) switch. Alternatively, or additionally, one or more of the data sources 112*a-d* may correspond to a device other than a TOR switch. The data sources 112*a-d* do not necessarily need to communicate using the same communication protocol because the processing system 108 may include components to facilitate protocol conversion and/or a data source 112 may be connected to the processing system 108 via a pluggable network adapter.

While the data sources 112*a-d* may correspond to a TOR switch, one or more of the data sources 112*a-d* may be considered host devices, servers, network appliances, data storage devices, or combinations thereof. A data source 112, in some embodiments, may correspond to one or more of a Personal Computer (PC), a laptop, a tablet, a smartphone, a server, a collection of servers, or the like. It should be appreciated that a data source 112 may be referred to as a host, which may include a network host, an Ethernet host, an InfiniBand (IB) host, etc. As another specific but non-limiting example, one or more of the data sources 112 may correspond to a server offering information resources, services and/or applications to user devices, client devices, or other hosts in the environment 100. It should be appreciated that the data sources 112 may be assigned at least one network address (e.g., an IP address) and the format of the network address assigned thereto may depend upon the nature of the network to which the data source 112 is connected.

FIG. 2 illustrates that one or multiple networking cables may be used to connect a data source 112 to a processing system 108. In some embodiments, a data source 112 (e.g., the first data source 112*a* and third data source 112*c*) may connect to a single port 208 (e.g., the first port 208*a* and fourth port 208*d*) via a bidirectional communication link 216. The bidirectional communication link 216 may be established over a networking cable and may utilize any suitable communication protocol known or yet to be developed for the transmission of data packets.

A data source 112 (e.g., the second data source 112*b* and fourth data source 112*d*) may alternatively, or additionally, be connected with the processing system 108 via multiple ports 208 (e.g., the second port 208*b*, third port 208*c*, fifth port 208*e*, and sixth port 208*f*). In such a configuration, one of the ports 208 may be used to carry packets from the processing system 108 to the data source 112 whereas the other of the ports 208 may be used to carry packets between the data source 112 and the processing system 108. As an example, the second port 208*b* is shown to receive packets from the second data source 112*b* via a data uplink 220 whereas the third port 208*c* is shown to carry packets from the processing system 108 to the second data source 112*b* via a data downlink 224. In this configuration, separate networking cables may be used for the data uplink 220 and the data downlink 224.

The processing system 108 may correspond to an optical switch and/or electrical switch. In some embodiments, the processing system 108 may include switching hardware 228 that is configurable to selectively interconnect the plurality of ports 208*a-f*, thereby enabling communications between the plurality of ports 208*a-f*, which enables communications between the data sources 112*a-d*. In some embodiments, the switching hardware 228 may be configured to selectively enable the plurality of data sources 112*a-d* to communicate in pairs based on a particular configuration of the switching hardware 228. Specifically, the switching hardware 228 may include optical and/or electrical component(s) 240 that are switchable between different matching configurations. In some embodiments, the optical and/or electrical components 240 may be limited in the number of matching configurations it can accommodate, meaning that a port 208 may not necessarily be connected with/matched with every other port 208 at a particular instance in time.

In some embodiments, the processing system 108 may correspond to an optical circuit switch, which means that the optical and/or electrical components 240 may include a number of optical and/or opto-electronic components that switch optical signals from one channel to another. The optical and/or electrical components 240 may be configured to provide an optical switching fabric, in some embodiments. As an example, the optical and/or electrical component(s) 240 may be configured to operate by mechanically shifting or moving an optical fiber to drive one or more alternative fibers. Alternatively, or additionally, the optical and/or electrical component(s) 240 may include components that facilitate switching between different port matchings by imparting electro-optic effects, magneto-optic effects, or the like. For instance, micromirrors, piezoelectric beam steering mechanisms, liquid crystals, filters, and the like may be provided in the optical and/or electrical components 240 to facilitate switching between different matching configurations of optical channels.

In some embodiments, the processing system 108 may correspond to an electrical switch, which means that the optical and/or electrical components 240 may include a number of electrical components or traditional electronic circuitry that is configured to manage packet flows and packet transmissions. Accordingly, the optical and/or electrical components 240 may alternatively or additionally include one or more Integrated Circuit (IC) chips, microprocessors, circuit boards, DPUs, simple analog circuit components (e.g., resistors, capacitors, inductors, etc.), digital circuit components (e.g., transistors, logic gates, etc.), memory devices, Field Programmable Gate Arrays (FPGAs), Application Specific Integrated Circuits (ASICs), combinations thereof, and the like.

Embodiments of the present disclosure contemplate operating a processing system 108 using a switching engine 244 and one or more ML models 132 stored in memory 128. The ML model(s) 132 may be used by the processor 116 of the processing system to execute an AI system as described herein.

In some embodiments, the processing system 108 may comprise a processor 116 or a system on a chip (SoC) configured to perform application-specific integrated circuit (ASIC) forwarding). The processor 116 or SoC may execute a programmable AI engine and a parser as described herein.

The processor 116 of the processing system 108 may be enabled to execute an AI programmable engine or inference engine as described herein.

Figure 3:
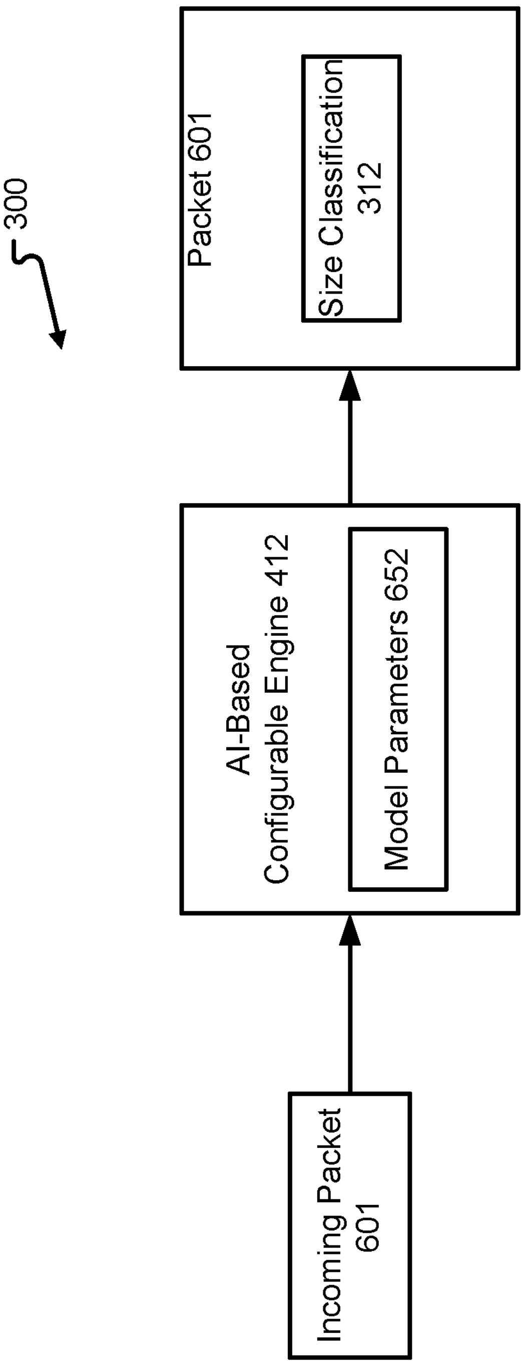
FIG. 3 is a block diagram of a system in accordance with one or more embodiments of the present disclosure.
Figure 4:
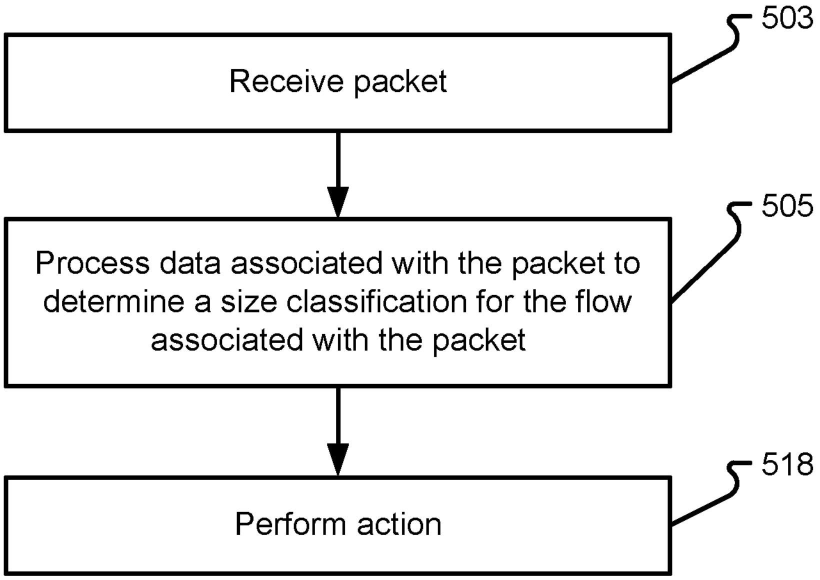
FIG. 4 illustrates a flowchart of a method in accordance with one or more embodiments of the present disclosure.

In some embodiments, a programmable AI mechanism 300 as illustrated in FIG. 3 may be implemented using a processor 116 of a processing system 108. Implementing the AI mechanism 300 may comprise performing a method as illustrated by the flowchart of FIGS. 4-5.

While described herein as being performed by a processor of a processing system 108, it should be appreciated the systems and methods described herein may be performed by a hardware device implemented in silicon or hardware—as opposed to software. Implementing the AI in silicon allows for the AI decision making features to be performed in the pipeline.

At 503, an incoming packet 601 may be received by a processing system 108. A packet (e.g., packet 601) may be sent to the processing system 108 by a data source 112 via a network 104 as illustrated in FIG. 1. At 505, upon being received by the processing system 108, data associated with the incoming packet 601 may be processed to determine a size classification for the flow associated with the packet 601. At 518, an action may be performed, based, at least in part, on the determined size classification.

Referring now to FIG. 3, the AI-Based Configurable Engine 412 may be trained to generate an output based upon an input. The input may be, for example, model parameters 652 and data associated with incoming packet 601. The output may be a size classification indication or other data which may be useful for packet identification, packet classification, action handlining, lookup generation, packet flow analysis, or other uses.

The AI-Based Configurable Engine 412 may comprise one or more of a decision tree, a neural network, and/or other forms of AI. The AI-Based Configurable Engine 412 may be specific to the packet and/or to the flow with which the packet is associated.

The AI-Based Configurable Engine 412 may be one or more silicon chips designed to perform parallel operations as required by AI. In some embodiments, the AI-Based Configurable Engine 412 may comprise an accelerator for parallel processing, such as one or more ASICs, CPUs, GPUs, FPGAs, or some combination thereof.

In some embodiments, the AI-Based Configurable Engine 412 may be a trained AI engine and may be implemented in silicon. By putting the AI-Based Configurable Engine 412 in the silicon, the AI-Based Configurable Engine 412 may be directly in the pipeline.

While the AI-Based Configurable Engine 412 may be implemented in silicon, the AI-Based Configurable Engine 412 may be programmable. An infrastructure may be built such that one or more models may be implemented with programmability. For example, a neural network in silicon which uses adjustable/programmable weights and parameters may be implemented in this way, and while the number of layers of the neural network may not be adjustable, the weights may be adjustable.

In some embodiments, the AI-Based Configurable Engine 412 may be programmable in the mean of the selection fields used for the model. In addition, the weights/model parameters 652 used for the AI-Based Configurable Engine 412 may be configurable.

A system as described herein offers programmability via configuration registers space. In some embodiments, a number of layers of the AI-Based Configurable Engine 412 is configurable by a user. For example, the number of layers may be adjusted, the weights of the model may be adjusted, and/or hyperparameters may be adjusted. In some embodiments, the AI-Based Configurable Engine 412 may comprise a decision tree, and the depth, children of nodes, etc., for the decision tree may be adjusted. In a neural network, width of each layer, number of layers, etc., may be adjusted. Any such adjustable parameters may be adjusted by a user via a user interface (not shown).

The AI-Based Configurable Engine 412 may enable a degree of freedom such that, while being expressed in hardware, the AI-Based Configurable Engine 412 may adapt as needed. In some embodiments, certain elements of the AI-Based Configurable Engine 412 may be adjustable. For example, in the case of a neural network, a number of active layers may be adjusted as needed, either manually or automatically.

The AI-Based Configurable Engine 412 may be configured to output a size classification. The size classification may refer to, for example, a size of the flow, e.g., in bytes, or bandwidth. In some embodiments, the size classification 312 may comprise a type of prediction or estimation output by the AI-Based Configurable Engine 412. In embodiments, the size classification 312 may be an indicator added to the packet 601 prior to transmission to the destination. In embodiments, the size classification 312 may be part of the metadata of the packet 601. In embodiments, the size classification 312 may be used to determine an action that may be performed on the packet 601.

The systems and methods described herein enable a wide range of use cases which improve upon conventional methods. Conventional methods of classifying a packet only using binary size classification are not always efficient.

Because the AI-Based Configurable Engine 412 is in the pipeline, the pipeline may be enhanced and may not be entirely replaced with AI. Each part of the pipeline may be benefitted by the AI-Based Configurable Engine 412. In this way, the pipeline can be enhanced and may provide a better experience. For example, an AI-Based Configurable Engine 412 as described herein may provide sophisticated prediction on received packets such as flow size or flow toggling rate or burstiness rate. Such high-level information may be used in telemetry systems creating a benefit. An AI system as described herein performs these functions with better resource utilization as compared to conventional systems.

As described herein, a computing system may be enabled to receive a packet, to analyze data associated with the packet, to determine a size classification for a flow associated with the packet in a more efficient manner than conventionally possible. The computing system may also perform an action, at least in part, based on the size classification for the flow associated with the packet. Such a computing system may comprise a hardware AI-based inference engine in a pipeline.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured according to the following:

(1) A network device comprising:

a configurable artificial intelligence engine; and one or more circuits that:

receive a packet;

process, using the configurable artificial intelligence engine, data associated with the packet to generate a size classification for a flow associated with the packet; and perform an action based, at least in part, on the size classification for the flow associated with the packet.

(2) The network device of any of (1), wherein the action performed is forwarding the packet based, at least in part, on the size classification for the flow associated with the packet.

(3) The network device of any of (1)-(2), wherein the data associated with the packet comprises at least one of header data of the packet and metadata of the packet.

(4) The network device of any of (1)-(3), wherein the configurable artificial intelligence engine comprises at least one of: a neural network implemented in silicon, a software implementation, and a decision tree.

(5) The network device of any of (1)-(4), wherein the one or more circuits further incorporate an indication of the size classification into the packet prior to forwarding the packet.

(6) The network device of any of (1)-(5), wherein the one or more circuits further generate telemetry data based on the size classification.

(7) A system, comprising:

one or more circuits that:

determine model parameters for a flow size classification model, wherein the flow size classification model classifies individual flows into one of a plurality of flow size classes;

deploys the flow size classification model using the determined model parameters; and processes data associated with packets to determine a flow size class for each packet.

(8) The system of (7), wherein the one or more circuits determine the model parameters by:

processing training data to generate a training data set, wherein the training data comprises packet capture files;

classifying the generated training data set into a classified training data set, wherein the classified training data set comprises the plurality of flow size classes; and training the flow size classification model based on the classified training data set.

(9) The system of any of (7)-(8), wherein the one or more circuits classify the generated training data set into the plurality of flow size classes by:

clustering the training data set; and determining the plurality of flow size classes based on the clustering of the training data set.

(10) The system of any of (7)-(9), wherein the one or more circuits cluster the training data set by:

calculating a bandwidth for each flow in the training data set; and clustering the training data set based on bandwidth.

(11) The system of any of (7)-(10), wherein clustering of the training data set based on bandwidth comprises clustering by a logarithm of the bandwidth.

(12) The system of any of (7)-(11), wherein a range of each of the plurality of flow size classes is different.

(13) The system of any of (7)-(12), wherein the one or more circuits employ unsupervised machine learning to classify the generated training data set into the classified training data set.

(14) The system of claim of any of (7)-(13), wherein the data associated with the packets comprises at least one of header data and metadata.

(15) The system of any of (7)-(14), wherein the metadata comprises packet sizes for adjacent packets and a time delta between the adjacent packets.

(16) The system of any of (7)-(15), wherein the flow size classification model comprises a neural network implemented in silicon.

(17) A method for generating a flow size classification model using machine learning, the method comprising:

generating a training data set;

classifying the generated training data set into a classified training data set comprising a plurality of flow size classes;

training the flow size classification model based on the classified training data set;

determining model parameters for the flow size classification model;

deploying the flow size classification model using the determined model parameters;

receiving a packet associated with a flow; and processing data associated with the packet to determine a flow size class for the packet.

(18) The method of (17), further comprising:
performing an action based, at least in part, on the determined flow size class for the packet.

(19) The method of any of (17)-(18), wherein the data associated with the packet comprises parsed data from a header of the packet generated by a parser.

(20) The method of any of (17)-(19), wherein the data associated with the packet comprises
metadata associated with the packet.

(21) A method for generating a flow size classification model using machine learning, the method comprising:
generating a training data set;
classifying the generated training data set into a plurality of flow size classes;
training the flow size classification model based on the classified training data set; and
determining model parameters for the flow size classification model.

(22) The method of (21), further comprising;
deploying the flow size classification model using the determined model parameters;
receiving a packet associated with a flow; and
processing data associated with the packet to determine a flow size class for the packet.

(23) The method of any of (21)-(22), further comprising:
performing an action based, at least in part, on the determined flow size class for the packet.

(24) The method of any of (21)-(23), wherein the data associated with the packet comprises parsed data from a header of the packet and/or metadata associated with the packet.

What is claimed is:

1. A network device comprising:
a configurable artificial intelligence engine; and
one or more circuits to:
receive a packet;
process, using the configurable artificial intelligence engine, data associated with the packet to determine, from among at least three possible size classifications, a size classification for a flow associated with the packet; and
perform an action based, at least in part, on the size classification for the flow associated with the packet.

2. The network device of claim 1, wherein the action performed is forwarding the packet based, at least in part, on the size classification for the flow associated with the packet.

3. The network device of claim 1, wherein the data associated with the packet comprises at least one of header data of the packet and metadata of the packet, the metadata defining borders between each of the at least three possible size classifications.

4. The network device of claim 1, wherein the configurable artificial intelligence engine comprises at least one of: a neural network implemented in silicon, a software implementation, and a decision tree.

5. The network device of claim 2, wherein the one or more circuits further incorporate an indication of the size classification into the packet prior to forwarding the packet.

6. The network device of claim 1, wherein the one or more circuits further generate telemetry data based on the size classification.

7. A system, comprising:
one or more circuits to:
determine model parameters for a flow size classification model, wherein the flow size classification model classifies individual flows into one of at least three possible flow size classes;
deploy the flow size classification model using the determined model parameters; and
process data associated with packets to determine a flow size class, from among the at least three possible flow size classes, for each packet.

8. The system of claim 7, wherein the one or more circuits determine the model parameters by:
processing training data to generate a training data set, wherein the training data comprises packet capture files;
classifying the generated training data set into a classified training data set, wherein the classified training data set comprises the at least three possible flow size classes; and
training the flow size classification model based on the classified training data set.

9. The system of claim 8, wherein the one or more circuits classify the generated training data set by:
clustering the training data set; and
determining the at least three possible flow size classes based on the clustering of the training data set.

10. The system of claim 9, wherein the one or more circuits cluster the training data set by:
calculating a bandwidth for each flow in the training data set; and
clustering the training data set based on the bandwidth.

11. The system of claim 10, wherein clustering of the training data set based on the bandwidth comprises clustering by a logarithm of the bandwidth.

12. The system of claim 7, wherein a range of each of the at least three possible flow size classes is different.

13. The system of claim 8, wherein the one or more circuits employ unsupervised machine learning to classify the generated training data set into the classified training data set.

14. The system of claim 7, wherein the data associated with the packets comprises at least one of header data and metadata.

15. The system of claim 14, wherein the metadata comprises packet sizes for adjacent packets and a time delta between the adjacent packets.

16. The system of claim 7, wherein the flow size classification model comprises a neural network implemented in silicon.

17. A method for generating a flow size classification model using machine learning, the method comprising:
generating a training data set;
classifying the generated training data set into a classified training data set comprising at least three possible flow size classes;
training the flow size classification model based on the classified training data set;
determining model parameters for the flow size classification model;
deploying the flow size classification model using the determined model parameters;
receiving a packet associated with a flow; and
processing data associated with the packet to determine a flow size class, from among the at least three possible flow size classes, for the packet.

18. The method of claim 17, further comprising:
performing an action based, at least in part, on the determined flow size class for the packet.

19. The method of claim 17, wherein the data associated with the packet comprises parsed data from a header of the packet generated by a parser.

20. The method of claim 17, wherein the data associated with the packet comprises metadata associated with the packet.

* * * * *